Jan. 19, 1960

N. L. MILLER ET AL 2,922,004

ELECTRIC CIRCUIT BREAKER

Filed Oct. 10, 1957

INVENTORS
Nairn L. Miller,
Herman J. Hammerly

BY *Robert H. Casey*

ATTORNEY

United States Patent Office 2,922,004
Patented Jan. 19, 1960

2,922,004

ELECTRIC CIRCUIT BREAKER

Nairn L. Miller, Farmington, and Herman J. Hammerly, Plainville, Conn., assignors to General Electric Company, a corporation of New York Application October 10, 1957, Serial No. 689,421

2 Claims. (Cl. 200—88)

Our invention relates to electric circuit breakers and particularly to electric circuit breakers suitable for use in the control of lighting and power branch circuits in residential, commercial and industrial buildings.

Patent No. 2,738,446, W. J. Fleming, assigned to the same assignee as the present invention, discloses a type of electric circuit breaker and panelboard combination which has come into wide use for branch circuit control in residential, commercial, and industrial buildings. In accordance with the teachings of this patent, an extremely compact circuit controlling assembly is provided including a plurality of elongated parallel bus bars having branch straps leading to a central row of upstanding contact blades, together with suitable insulating and supporting means. For use therewith, there is also provided a plug-in type electric circuit breaker, as shown in application Serial Number 542,748, W. J. Fleming, filed October 25, 1957, and assigned to the same assignee as the present invention, which is adapted to have one end releasably retained by a retaining lug on the panelboard support and to have its other end plugged into electrical contact with a contact blade at the center of the panel board. Thus there is provided a central row of contact blades flanked by two rows of retaining lugs, a circuit breaker being adapted to be mounted between each retaining lug and its corresponding contact blade, each contact blade being adapted to connect and energize two of such circuit breakers. Each circuit breaker is made of a width substantially equal to the center-to-center spacing of the contact blades.

While such circuit breakers and panelboards have greatly improved the space requirements for the control of branch circuits and provide a very compact and flexible means of controlling a large number of circuits, there has been a continuing need and demand for even more compact circuit breaker assemblies and for the control of a greater number of electric circuits in a relatively small space, especially for applications having a number of relatively low power circuits to be controlled. It is, nevertheless, very desirable that the basic panelboard construction shown in these patents, which is presently in use by large numbers of users, shall not be substantially altered so as to render such panelboards obsolete. In addition, it is desirable that the spacing and size of such panelboard constructions be retained in order to be able to utilize circuit breakers of the prior type if desired, such for instance as for the control of branch circuits of high capacity.

It is an object of our invention to provide an electric circuit breaker which will make possible the control of a greater number of circuits in a given space then has heretofore been possible.

Another object of our invention is to provide an electric circuit breaker of smaller size than heretofore available but which may nevertheless be mounted in conventional panelboards without alteration of the size or spacing of the contacts in such panelboards.

Another object of our invention is to provide an electric circuit breaker which utilizes the mounting space and mounting means of a single one of such prior art circuit breakers and which has a single plug-in line contact, but which nevertheless provides for independent control and protection of more than one electric circuit.

Another object of our invention is to provide a circuit breaker incorporating a simplified operating mechanism including both thermal and magnetic tripping action.

In accordance with our invention we provide an electric circuit breaker comprising an insulating casing having a single line contact at one end thereof and having two independent circuit breakers contained in side-by-side recesses in the intermediate portion of the casing, and two electrically separate load terminals at the opposite end of the casing. The size and dimensions of the casing, in accordance with our invention, are preferably made identical with the size and dimensions of single prior art plug-in type circuit breakers, whereby our improved dual circuit breaker comprising two complete circuit breakers, may be plugged into the space presently occupied by one such prior art circuit breaker.

Other objects and advantages of our invention will become apparent from the following detailed description, and its scope will be pointed out in the appended claims.

Figure 1:
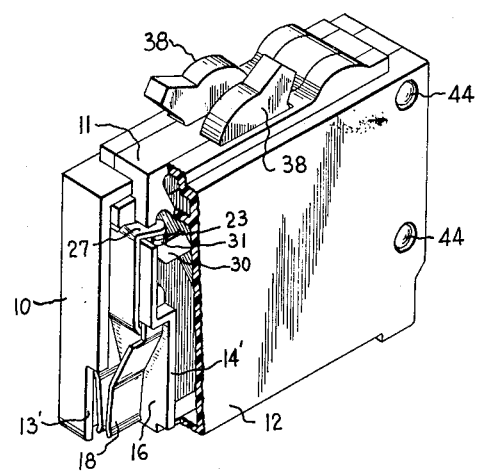
Figure 1 is a perspective view of an electric circuit breaker constructed in accordance with our invention, a portion of the casing being broken away.
Figure 2:
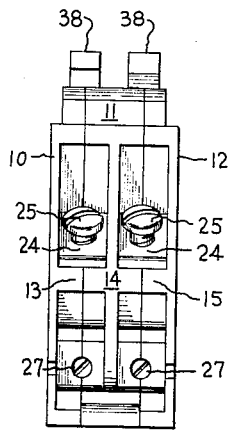
Figure 2 is an end elevation view of the circuit breaker of Figure 1.
Figure 4:
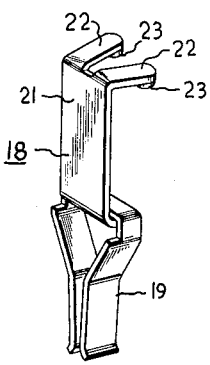
Figure 4 is a perspective view of the line terminal utilized in the circuit breaker of Figure 1.

In accordance with our invention, we have shown our invention as embodied in an electric circuit breaker comprising a generally rectangular insulating casing including two outer side portions 10 and 12, and an intermediate portion 11.

The portions 10 and 12 each include a major planar wall portion and peripheral wall portions 13 and 15 respectively. The intermediate portion 11 includes a major planar wall portion and two oppositely directed peripheral wall portions 14. The three parts, 10, 11 and 12 are adapted to form two major side-by-side chambers 6 and 8 within the casing, generally parallel to the major wall portions.

In addition, the intermediate portion 11 is notched or cut away adjacent one corner, and the portions 14' of the walls 14 extend out to both outer side portions at this point, providing a third chamber 16, extending transversely from side-to-side of the casing. The portions 13' and 15' of the walls 13 and 15 at this end of the casing abut each other and also have portions cut away to provide an L-shaped slot entrance to the chamber 16 extending along the end wall and the bottom wall of the circuit breaker casing.

A plug-in type line terminal 18 is positioned in the chamber 16. The terminal 18 includes a generally U-shaped contact jaw portion 19 having the outer portions of its opposite sides bent inwardly to provide a resilient socket for cooperation with a contact blade such as 20 (see Figure 3). The circuit breaker enclosure includes a recessed portion 45 adapted to receive the inwardly directed end of a mounting hook or support 46 about which the circuit breaker enclosure may be pivoted so as to engage the terminal 18 on the stationary contact blade 20. The terminal 18 also includes an extension 21 terminating in two angularly disposed projections 22, each carrying a relatively stationary contact 23 thereon. The contact jaws 19 and the extension 21 are positioned within the transversely extending recess 16, while the projections 22 are adapted to straddle a portion of the central wall 11 and to extend into each of the circuit breaker chambers 6 and 8. The terminal 18 is retained in place in chamber 16 by the conforming recesses and abutments of the cooperating casing parts, such, for example, as the walls 13', 14' and the portions of the peripheral walls 14 which engage the extension 21 and the terminations 22.

A pair of load terminals 24 is provided, each being positioned in one of the chambers 6 and 8 respectively. Each of the terminals 24 is retained in position by cooperating recesses and abutments on the cooperating casing portions, as shown, especially in Figure 3. And each carries a terminal clamping screw 25 threadedly engaged in the outer portion thereof.

An elongated straight strip of bimetallic material 26 is rigidly attached to the offset end portion of the strap of the terminal member 24 by suitable means, such as by welding. The juncture point of the bimetallic strip 26 and the terminal strap 24 is drilled and tapped to receive a calibrating screw 27 which is threadedly engaged therein and which has its head portion rotatably received in a recess 28 formed by the cooperating casing portions and having a reduced portion for permitting access for adjustment thereof by suitable means such as by a screwdriver. The head of the screw 27 and the cooperating recess 28 are designed to prevent substantially all movement of the calibrating screw 27 other than rotational movement thereof about its longitudinal axis. Rotation of the calibrating screw 27 therefore causes the connected ends of the bimetallic strip and terminal strap to move toward or away from the corresponding casing wall, thereby bending the intermediate portion of the terminal strap 24 and changing the angle at which the bimetallic strip 26 extends. This changes the location of the opposite end of the bimetallic strip with consequent adjustment of the position of the latching surface carried thereby, to be described.

Figure 3:
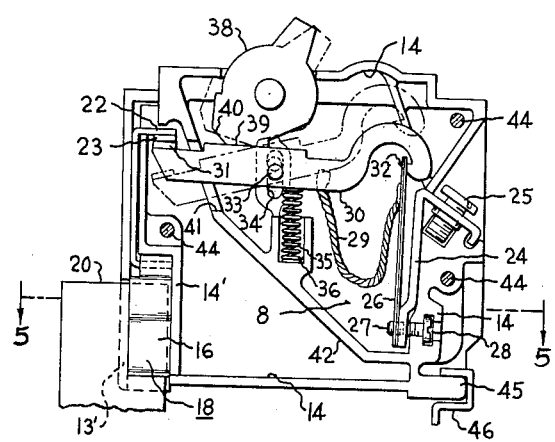
Figure 3 is a side elevation view of a circuit breaker of Figure 1, with one side portion of the casing removed.
Figure 5:
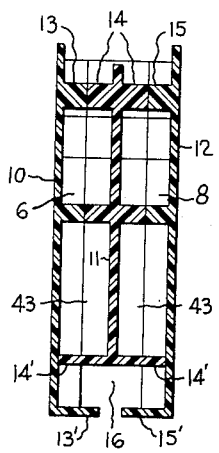
Figure 5 is a sectional view taken substantially on the line 5—5 of Figure 3.

A flexible conductor 29 has one end rigidly attached to the bimetallic strip 26 adjacent its movable end and has its other end connected to a contact arm 30. The contact arm 30 is preferably formed from relatively thin flat conductive material and has a contact 31 suitably attached thereto at one end, and has its other end offset and provided with a hook-shaped or return-bent portion terminating in a latching surface 32. The bimetallic strip 26 is provided with an aperture into which the latching projection 32 of the contact arm 30 is adapted to extend when the circuit breaker is in the latched condition, as shown in Figure 3. The contact arm 30 also includes a transversely extending pin 33 rigidly fastened to the intermediate portion thereof and having its outer ends adapted to ride in guiding slots 34. A compression-type spring 35 is also provided, and has one end positioned in a conforming recess 36 formed by cooperating parts of the casing, and has its other end adapted to bear against the underside of the contact arm 30, the contact arm 30 being provided with a projection 37 for positioning the spring at this point.

For the purpose of operating the contact arm 30 between open and closed circuit positions, we provide an operating handle 38 pivotally supported between the outer casing portion and the central casing portion.

The operation of the circuit breaker mechanism is as follows. When the parts are in the "on" position as shown in Figure 3, the compression spring 35 urges the intermediate portion of the contact arm 30 upwardly. Since the latch portion 32 is in engagement with the latching surface of the bimetallic strip, the resulting action is a pivotal movement about the latch portion 32 until the movable contact 31 engages the relatively stationary contact 23. The upward bias of the spring 36 on the contact arm 30 also serves to retain the handle 38 in its "on" position by engagement with the flat surface 39. When the handle 38 is moved in a counter-clockwise direction as viewed in Figure 3, the forward portion of the contact arm 30 is depressed by the inner portion of the handle until the handle reaches a stable condition in which the flat surface 40 is against the contact arm 30. This retains the forward end of the contact arm 30 in a depressed condition and also retains the handle 38 in its "off" position. With the parts in the position shown in Figure 3, in the case of an overload existing in the circuit controlled by the circuit breaker, the bimetallic strip 26 is so constructed and arranged as to deflect toward the left as viewed in this figure, until the movable end disengages the latching surface 32 of the contact arm 30. This permits the right hand end of the contact arm 30 to move upwardly under the influence of the compression spring 35. As this occurs, the contact arm 30 rocks about a portion of the operating handle 38 at one end of the flat portion 39, thereby moving the movable contact to open circuit position as indicated in dotted lines in Figure 3. As this occurs, the direction of force exerted on the handle 38 is such as to cause the handle 38 to move further in the "on" direction to the trip indicating position as shown in dotted lines.

In order to reset the circuit breaker, the handle member 38 is moved in the counterclockwise direction toward the "off" position. As this occurs, the forward or left hand portion of the contact arm 30 is depressed until it strikes the surface 41 of the insulating barrier 42 which preferably forms an integral part of the casing portions 11 and 12 and separates the arcing chamber 43 from the remaining portion of each circuit breaker chamber 6 and 8. Continued movement of the intermediate portion of the contact arm 30 in a downward direction causes a rocking action of the contact arm 30 about the surface 41 until the right hand portion of the contact arm, reaches the relatched position in which the latching projection 32 is once again in engagement with the latching surface of the bimetallic strip 26.

It will be observed that the current through the bimetallic strip 26 and the terminal strap 24 travels in opposite direction. This creates a magnetic repelling force which acts on the bimetallic strip in a direction to cause or accelerate tripping and affords an "instantaneous" tripping action.

The casing portions 10, 11 and 12 are retained together in a suitable manner such as by rivets 44 passing through the casing portions.

The electric circuit breaker mechanisms contained in the two chambers 6 and 8 are substantially identical, and are also independent of each other excepting for the fact that both derive their power from the same source. Since the two circuit breakers are, however, carried by and included in the same enclosure, only a single line terminal connection is necessary and this affords a ready means for mounting and connecting such circuit breakers in a panelboard of the conventional construction. Thus two breakers may be mounted in the space formerly required for only one breaker, see Figure 3, and a total of four breakers may be energized by a single contact blade 20. It will be appreciated that if the two circuit breakers were included in independent casings one-half the width of the common casing shown herein, it would be virtually impossible to mount and energize such circuit breakers from such conventional panels. Since many modifications of our invention will readily occur to those skilled in the art, it is intended by the appended claims to cover all such modifications as fall within the true spirit and scope of our invention.

What we claim as new and desire to secure by Letters Patent of the United States is:

1. An electric circuit breaker assembly comprising a generally rectangular insulating casing including at least two side-by-side circuit breaker recesses, a relatively stationary contact supported within each of said recesses, a relatively movable contact supported in each of said recesses and movable into and out of engagement with said relatively stationary contact in said recess, circuit breaker operating mechanism supported in each of said recesses for operating said relatively movable contact therein and including a manually operable handle member projecting through the top wall of said casing, a separate load terminal for each of said circuit breakers supported on said casing at one end thereof, means including a flexible electrical conductor connecting each of said load terminals to a corresponding one of said movable contacts, a common plug-in line terminal assembly for both of said circuit breakers carried by said insulating casing adjacent the end of said casing opposite said one end, said relatively stationary contacts being mounted on said plug-in line terminal assembly, and an integral lug portion integral with said insulating casing at said one end portion adapted to permit the releasable engagement of said casing under a pair of hook-shaped retaining elements and pivotal movement thereof about said retaining releasable engagement and into plug-in engagement with said common line terminal assembly.

2. An electric circuit breaker comprising an insulating casing, a relatively stationary contact mounted in said casing at one end thereof, an elongated switching member pivotally supported intermediate the ends of said casing and having a contact surface at one end thereof adapted to cooperate with said relatively stationary contact and having a return-bent portion adjacent its other end terminating in a latching surface, a bimetallic strip member having one end thereof relatively stationary and carrying a latch surface adjacent its other end adapted to releasably restrain said latching surface of said switching member, and a terminal member carried by said casing at the end thereof opposite said one end said terminal member being connected electrically in series with said bimetallic strip and including a portion extending parallel to and closely spaced from said bimetallic strip throughout a major portion of its length, whereby a repulsion force is set up between said terminal member and said bimetallic strip on the occurrence of short-circuit conditions, said force acting on said bimetallic strip in a direction to cause release of said latching surface.

References Cited in the file of this patent

UNITED STATES PATENTS

| | | |
|---|---|---|
| 1,886,284 | Luther | Nov. 1, 1932 |
| 2,229,412 | Jennings | Jan. 21, 1941 |
| 2,627,563 | Thomas | Feb. 3, 1953 |
| 2,719,203 | Gelzheiser | Sept. 27, 1955 |
| 2,783,330 | Casey | Jan. 31, 1955 |
| 2,797,278 | Gelzheiser | June 25, 1957 |
| 2,810,048 | Christensen | Oct. 15, 1957 |